FOUR-WIRE TRANSISTORIZED CONFERENCE CALL TELEPHONE SYSTEM

Filed Feb. 6, 1961

3 Sheets-Sheet 1

INVENTOR.
JOHN E. COX

BY Phillip A. Weiss
ATTORNEY

FOUR-WIRE TRANSISTORIZED CONFERENCE CALL TELEPHONE SYSTEM

Filed Feb. 6, 1961 3 Sheets-Sheet 2

FOUR-WIRE TRANSISTORIZED CONFERENCE CALL TELEPHONE SYSTEM

Filed Feb. 6, 1961 3 Sheets-Sheet 3

COMMON POWER SUPPLY 3,116,369

FOUR-WIRE TRANSISTORIZED CONFERENCE CALL TELEPHONE SYSTEM

John E. Cox, Passaic, N.J., assignor to International Telephone and Telegraph Corporation, a corporation of Maryland Filed Feb. 6, 1961, Ser. No. 87,415
9 Claims. (Cl. 179—1)

This invention relates to four-wire telephone systems and more particularly to conference call circuits for use in such systems.

Conference call circuits commonly use either hybrid arrangements for effectively isolating the transmitters of a subscriber station from the receivers of the same station or common bus bars for transmitting signals and common bus bars for receiving signals, in which case isolation between the transmit and the receive circuits is provided by amplifiers coupled between the common bus bars. These methods of isolation are used in an effort to overcome some of the difficulties inherent in conference call circuits. Among these difficulties are singing, echo, and attenuation caused by feedback between the transmitter and receiver of the common station, by improper impedance terminations between stations, by improper impedance matching, and by power drain due to the number of telephones connected to a common circuit.

When hybrid circuits are used to minimize these difficulties, new problems are introduced because it is necessary to balance the hybrid network against the subscriber lines. When common buses are utilized for minimizing these difficulties, it has been necessary to use complicated and expensive amplifiers in conjunction with the buses.

Accordingly, it is an object of this invention to provide new and improved four-wire conference call circuits.

Another object of this invention is to provide transistorized conference call circuits that do not utilize either hybrid networks or common buses joined by complicated and expensive amplifiers.

Yet another object is to terminate each transmitter and receiver used in such circuits by its charateristic impedance.

A further object of this invention is to provide an inexpensive and economical conference call circuit. In this connection, an object of this invention is to provide conference call circuits wherein "singing" is eliminated, echo is minimized, and loss due to attenuation is compensated for by inexpensive amplifiers.

In accordance with one aspect of this invention, a conference call circuit is provided with "$n$" number conference channels, each comprising a transmit circuit and a receive circuit. Common to the output of the transmit circuit of each channel are "$n-1$" amplifiers each of which features a negative feedback arrangement. The feedback stabilizes the amplifiers and allows use of unmatched, inexpensive commercial grade components. The transmitter of each conference channel is individually connected to all the receivers of the other channels through the "$n-1$" amplifiers, there being one amplifier per connected receiver. The number of amplifiers is "$n-1$" because there is no connection in the conference circuit between the transmit circuit and the receive circuit of the same conference channel.

The above mentioned and other objects of this invention, together with the manner of obtaining them will become more apparent, and the invention itself will be best understood by making reference to the following description of a preferred embodiment of the invention taken in conjunction with the accompanying drawings, in which:

FIG. 1*a* shows by block diagram a conference call circuit utilizing the invention in connection with automatic switching equipment;

FIG. 1*b* shows by block diagram a conference call circuit utilizing the invention in connection with manual equipment;

FIG. 2 is a schematic diagram showing a preferred embodiment of the invention used in the conference channels shown in FIG. 1*a*;

FIG. 3*a* is a schematic circuit diagram showing a preferred embodiment of the invention used in the conference channels shown in FIG. 1*b*; and FIG. 3*b* is a schematic circuit diagram of the power supply utilized by the circuits of FIGS. 2 and 3*a*.

Where possible, simple terms are used and specific items are described hereinafter to facilitate an understanding of the invention; however, it should be understood that the use of such terms and reference to such items are not to act in any manner as a disclaimer of the full range of equivalents which is normally given by established principles of patent law. To illustrate, the attached drawings show stepping switches which are used when the conference call circuit is automatically connected, whereas any type of automatic switches such as crossbar switches may be utilized. Quite obviously, other examples could be selected to illustrate the manner in which specific terms that have been used and items which have been described are entitled to a wide range of equivalents.

BRIEF DESCRIPTION

An examplary telephone system incorporating the principles of this invention used in connection with automatic switching equipment is included in FIG. 1*a*. There is shown a telephone conference call circuit comprising a plurality of automatic switch trains, subscriber stations, and an attendant's cabinet providing means for the attendant to set up the conference call by interconnecting the subscribers through conference call channels and the automatic switch trains. Each of the conference channels has associated therewith a lamp in the attendant's cabinet to aid in the supervision by the attendant of the conference connection. The conference channels include a transmit portion and a receive portion. The transmit portions of each of the channels contains a multiplicity of amplifiers such as amplifiers through which the transmit portion of the channel is interconnected to the receive portions of all the other channels in the conference call circuit. The number of amplifiers per channel is one less than the number of channels since the transmit portion and the receive portion of the same channels are not interconnected. The amplifiers thereby function to isolate the transmit and receive portion of the channels as well as to provide the necessary power to permit transmission of speech with negligible loss.

In operation, a calling subscriber at a four-wire station "A" is connected to a four-wire station "B" via a well known step-by-step type switch train including linefinder, selector, second selector, and connector. It should be understood that each of the arrows 5–8 which interconnect the switches in FIG. 1*a* indicates a number of brush and bank terminals that are sufficient to extend the four-wire telephone circuit and control connections. Thus, subscriber "A" initiates a call by removing a handset to operate the "linefinder" and thereafter dials the directory number of called station "B" to set the "selector," "second selector," and "connector." The connector tests the called line and rings station "B" if it is then idle.

In carrying out this invention, the calling subscriber may also extend a connection through a portion of the automatic switch train to an attendant cabinet 9 if a conference call is desired. More specifically, the calling subscriber "A" removes a receiver or handset and dials a predetermined digit, such as "0," to drive the "selector" to a preselected level giving access to the attendant cabinet 9 via a six wire line 10 including a transmit pair "T," receive pair "R," and a control pair of private or sleeve conductors $P_1$, $P_2$. The attendant at cabinet 9 talks to the subscriber at station "A" and learns that a conference call between "A" and stations "C–F" is desired. Thereafter, the attendant connects an idle conference channel to a second selector by way of patch cord 20 interconnecting jack pairs such as 18, 19 which are individual to the conference channels and second selectors. Then the attendant having access to one of the desired subscribers dials out over the connected second selector such as shown in switch trains 11–14, on a one at a time basis, to seize and signal each of the subscriber stations "C—F" in a conventional manner.

To conference the stations "A" and the called stations "C–F" the attendant at cabinet 9 with patch cords such as cord 20 completes talking channels between each of the called stations and a common link 15 in the conference call equipment 17. Each of the trunk lines associated with the attendant trunk level "0" terminates in a pair of jacks similar to jacks 18, 19.

There being a transmit jack "T" and a receive jack "R" in each case. Thus, the attendant uses a patch cord such as cord 20 to interconnect the subscriber station "C" and an idle conference call channel such as No. 1 on an individual basis by interconnecting jacks 18, 19. In a similar manner, other patch cords (not shown) interconnect the noted subscriber stations "A" and "D–F" through conference call channels No. 2–No. 5. Quite obviously key controlled circuits could be substituted for the patch cords.

Each of the conference call channels includes a transmit circuit and a receive circuit, such as 22, 23. Each transmit circuit includes a number of amplifiers Q11–Q14 which increase signal strength to compensate for the added lines. The inputs of each transmit circuit and the outputs of each receive circuit are connected to the subscriber lines as by jacks 18, 19 and patch cord 20. The outputs of the transmit channels and the inputs of the receive channels are interconnected by the common channel 15, here shown as a number of conductors or busses. Thus, each subscriber line is connected to all other lines in the conference call circuit by way of these conductors.

Means are provided for isolating the transmit circuit of the conference channels from the receive circuit of the same channel. Referring specifically to transmit circuit 2, by way of example, the isolation means are shown generally as four amplifiers Q11, Q12, Q13 and Q14 through which the transmit circuit is connected to the receive circuit of the other four conference channels No. 2–No. 5. Each amplifier includes negative feedback to provide stabilization and also to make it possible to use inexpensive transistors and other components. It is the unidirectional characteristics of these amplifiers that almost completely isolates the transmit from receive portions of each channel. Because of the isolation, the circuit eliminates singing and minimizes echo.

Power transfer is maximized because each circuit is terminated by a characteristic impedance, with provisions for automatically inserting and removing such impedance as necessary. Any attenuation caused by the inherent adverse conditions of the conference call circuit is compensated for by the amplification provided by the amplifiers.

It should be noted that the isolation referred to above is a result of the circuitry wherein each amplifier is connected to only one receiver. Also, because the amplifiers are substantially unidirectional, there is no path whereby the transmitted signal can be received in the receive circuit of the conference call channel that contains the active transmitter.

The isolation means, such as amplifiers Q11–Q14, therefore tend to eliminate "singing" and minimize echo. At the same time, the amplification of the isolation means obviates the attenuation caused by such things as the multiplicity of phones included in the conference circuit and provides a conference connection with substantially zero loss.

FIG. 1*b* shows another embodiment of the invention in block diagram form wherein the circuits are manually conferenced. More specifically there is shown a conference call circuit that is manually set up by the operator at operator position 50 by such means as jacks or keys. The circuit indicates a plurality of subscribers "A–F" individually connected to the operator's position. Also individually connected to the operator's position are an equal number of conference channels Nos. 1–5. The conference channels are divided into transmit portions, such as T51, and receive portions, such as R52, of conference channel No. 1. Each of the transmit portions is connected to the receive portions of all the other conference channels but not to the receive portion of its own channel. Thus, transmit portion T51 is not connected to receive portion R52. The operator manually connects the subscribers individually to a conference channel at the request of any of the subscribers. The details of the conference channels are the same as the conference channels of FIG. 1*a*. The supervisory circuits, however, are different as will become apparent from the detailed description to follow.

DETAILED DESCRIPTION

Figures 1A, 1B:
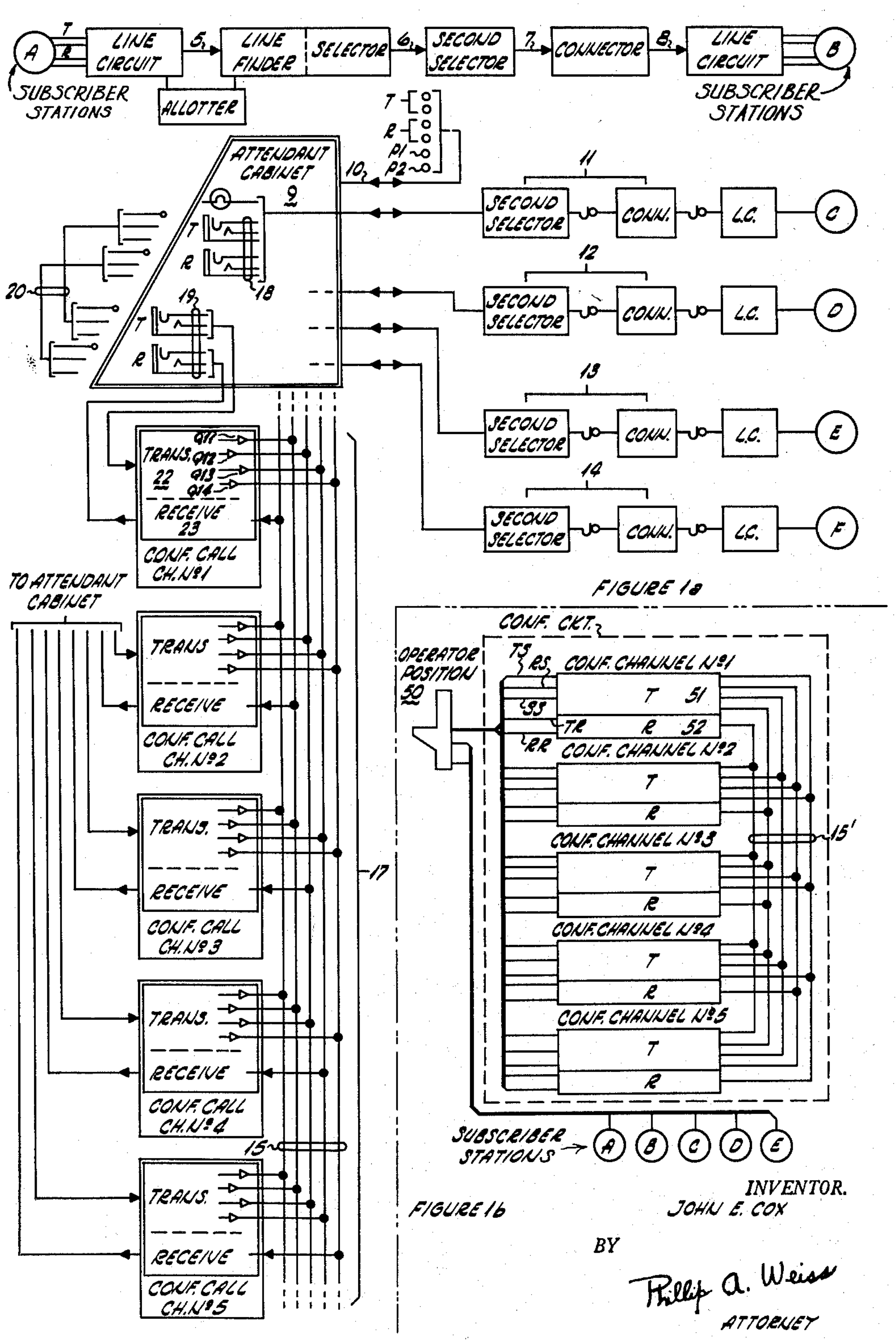
Figure 2:
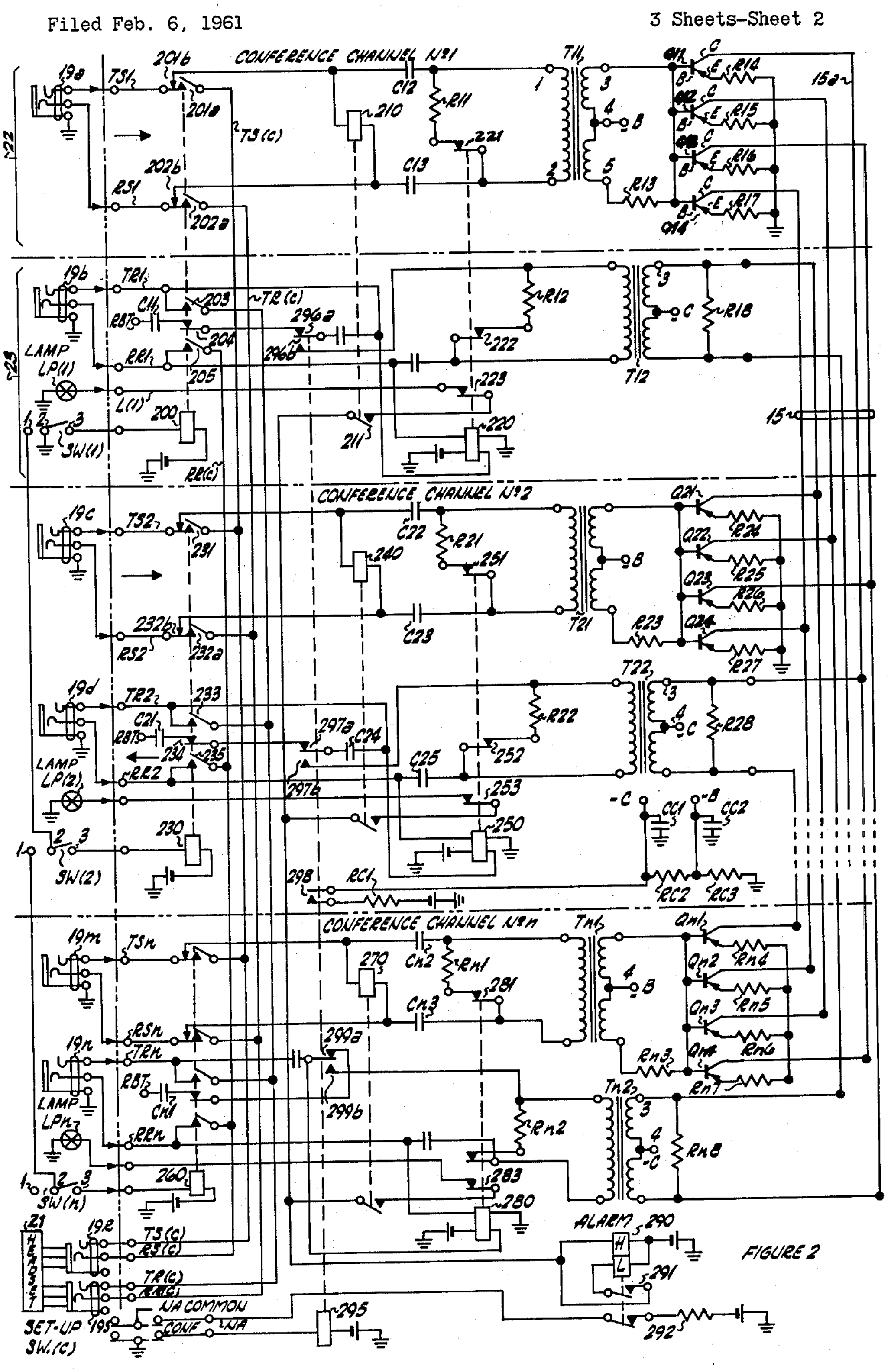

For a more complete understanding of the invention, reference is made to the schematic circuit diagrams of FIGS. 2 and 3 which show in detail the component parts of the conference channels of FIGS. 1*a* and 1*b* respectively.

*The automatically connected conference call circuit.*—A plurality of conference channels No. 1, No. 2 and No. *n* are shown in FIG. 2. In each there is a transmit or send channel 22 and a receive channel 23. Connecting means such as jacks 19*a*, 19*b*, are provided for joining the transmit and the receive channels to the attendant's positions.

In greater detail, FIG. 2 shows the transmit jack 19*a* as connected to tip and ring leads TS1 and RS1 in the transmit channel 22. Also, the receive jack 19*b* is connected to the tip and ring leads TR1 and RR1 in the receive circuit 23. The tip and ring leads in the conference call channel No. 2 are connected to the attendant's position at jacks 19*c*, 19*d*; and the tip and ring leads in the channel No. *n* are connected at jacks 19*m*, 19*n*.

Chain circuit means are provided for connecting the attendant cabinet with each of the subscriber lines connected to jacks 19*a*, 19*b*, 19*c*, 19*d* . . . and 19*m*, 19*n*. More specifically, at the attendant cabinet are "*n*" number single pole, double throw, talking key switches SW(1), SW(2) . . . SW(*n*). Terminal 1 of switch SW(1) is connected to terminal 2 of switch SW(2); terminal 1 is connected to terminal 2 of the next switch until terminal 1 of switch SW(*n*–1) is connected to terminal 2 of switch SW(*n*). Terminal 1 of switch SW(*n*) is not connected to anything. Terminal 2 of switch SW(1) is grounded. To switch the attendant's telephone set into communication with each of the subscriber stations, the switch SW in a particular channel is thrown to position "3" where a relay, such as relays 200, 230 . . . 260, is operated. Since terminal 2 of each of the switches is connected to the armatures of those switches and, further, since terminal 2 of switch SW(1) is the only ground source associated with any of the switches, only one relay of the aforementioned group of relays can be operated at a time; therefore, the attendant can only communicate with one subscriber at a time. For example, with relay 200 operated, communication is through contacts 201*a*, 202*a*, 203 and 205. At this same time, corresponding contacts in channels No. 2–No. *n* are open because the chain circuit to relays 230, 260 is broken at contacts 1, 2 of switch SW(1).

Responsive to the operation of switch SW(1) armature to terminal 3, relay 200 operates over a circuit that can be traced from ground through terminal 2, the armature, and terminal 3 of switch SW(1), and the coil of relay 200 to battery.

Responsive to the operation of relay 200, make-before-break contacts 201a close to complete a talking circuit from the tip lead (not shown) in the subscriber's line circuit through the automatic switch train, the attendant's cabinet via a patch cord, jacks 19a, lead TS1, contacts 201a, lead TS(c), jack 19R to the attendant's headset 21. Make-before-break contacts 202a complete the talking circuit from the ring lead (not shown) in the subcriber's line circuit through the automatic switch train, the attendant's cabinet 9 via a patch cord, plugs and jacks 19a, lead RS1, contacts 202a, lead RS(c) and jack 19R to the attendant's headset 21. Break contacts 201b, 202b open the talking circuit through conference channel No. 1. Contacts 203, 205 close similar talking circuits from the subscriber station to the attendant's headset 21. Contacts 204 open to remove the ringback tone by opening the tone circuit from the ringback tone source RBT.

The operation of switches SW(2) through SW($n$) has the same effect on their respective conference channels as switch SW(1) has on channel No. 1. Each of the aforementioned switches is normally maintained in position whereby the armature is in contact with its terminal 1 unless the attendant desires to communicate with the subscriber attached to a particular conference channel and thus the attendant is limited to communicating with only one subscriber at a time.

Means, such as relay 210, are provided for indicating that the conference channel is connected to an automatic switch train. Relay 210 is operated by a loop battery and ground coming from the automatic switch train via the tip and ring of jack 19a in a manner which is well known in the art of automatic telephony.

Responsive to the operation of relay 210, contacts 211 close to operate relay 290 over a circuit that can be traced from ground in receive channel 23 through the filament of lamp LP1, line L(1), contacts 223, 211 and the upper or high resistance winding H of relay 290 to battery. The current flowing through the circuit just traced is insufficient to light lamp LP1 due to the high resistance in the circuit of the coil of relay 290.

When relay 290 operates, contacts 291 close to complete a hold circuit for relay 290 that can be traced from ground through the filament of lamp LP1, line L(1), contacts 223, 211 and 291 and the lower or low resistance winding L of relay 290 to battery. The current flowing in this circuit is sufficient to cause lamp LP1 to light and thereby indicate that the conference channel No. 1 is connected to an automatic switch train. Also responsive to the operation of relay 290, contacts 292 close to extend a resistance battery marking to a night alarm NA lead over an obvious circuit. Conference channels No. 2 through No. $n$ contain indicating means similar to relay 210 comprising relays such as 240 and 270 and associated circuitry.

Means are provided for blocking the direct current utilized to operate the indicating means. The direct current is blocked to prevent shorting the coil of relay 210 through the primary winding of transformer T11. That is, as here shown, the capacitors C12, C13 block direct current in the transmit side of the conference channel No. 1, while similar capacitors are utilized in conference channels No. 2–No. $n$.

This embodiment of the invention shows the transmit and receive means shunted by terminating impedance such as R11, R12, R21, R22, R$n$1 and R$n$2. These impedances are equivalent to the circuit characteristic impedance of the receiver and the transmitter and function to provide maximum power transfer, minimize echo and also, in the case of R12, R22, R$n$2, permit idle channels to soak up the signal power that is normally transmitted to the subscriber.

Answer supervision is provided when relay 220 in conference channel No. 1 operates by the battery reversal which occurs when an associated line is off-hook. In greater detail, relay 220 is operated over a circuit that extends from battery through a winding on relay 220, the tip conductor TR1 and from ground through the other winding on relay 220 to the ring conductor RR1.

Responsive to the operation of relay 220, contacts 221, 222 open to remove the terminating impedance resistors R11, R12 that shunt the transmit and receive circuits of conference channel No. 1 when that channel is not in use. Also responsive to the operation of relay 220, contacts 223 open to extinguish lamp LP1, thus indicating to the attendant that the called party has answered. Channel No. 2 discloses relay 250 and channel No. $n$ discloses relay 280 to accomplish in their associated channels the functions of relay 220.

Means are provided for extending ringback tone to the calling subscriber during the period of waiting for all subscribers to answer. The tone circuit in conference channel No. 1 can be traced from a ringback tone source RBT through coupling capacitor C11, contacts 204, 296a to tip lead TR1 of the receive circuit to the calling subscriber. The ringback tone circuit of the other conference channels are identical.

Coupling means are provided between the portion of the transmit circuit of the conference channel that is connected to the jacks on the attendant's cabinet and the portion of the transmit circuit that is connected to the receive circuits in the other conference channels. In conference channel No. 1 the coupling means is transformer T11; in channel No. 2, transformer T21; and in channel No. $n$, transformer T$n$1.

In a similar manner the receive circuits in the conference channels contain coupling means such as transformer T12 conference channel No. 1, transformer T22 in conference channel No. 2 and transformer T$n$2 in conference channel No. $n$. The transformer provide impedance matching, isolation and amplification.

The secondary windings of each transformer are permanently shunted with matching impedance such as resistors R13 and R18 in conference channel No. 1, resistors R23, R28 in conference channel No. 2 and resistors R$n$3, R$n$8 in conference channel No. $n$. These resistors also maximize power transfer and reduce reflections.

In accordance with one aspect of this invention, a number ($n$—1) isolating means are provided in the transmit circuits of each of the $n$ conference channels. For example, transistor amplifiers Q11, Q12, Q13 and Q14 are in conference channel No. 1; transistor amplifiers Q$n$1, Q$n$2, Q$n$3 and Q$n$4 are in conference channel No. $n$. In an exemplary circuit these transistors were type RCA 2N408. The transmit circuits, such as 22, of each of the conference channels is connected to the receive circuits, such as 23, of each of the other conference channels through one of the transistor amplifiers. The unidirectional characteristics of the transistors assist in isolating the transmit circuit from the receive circuit and thereby reduce singing and echo to a minimum since there is no feedback path from the receiver to the transmitter. At the same time the amplification provided by the transistors tends to cancel any inherent attenuation in the circuit. Moreover, these amplifiers provide the necessary sparation between transmit and receive signals without requiring hybrid networks which are difficult to balance, especially when used with a number of telephone lines having impedances that vary from connection to connection as is common with switched circuits.

Means are provided for stabilizing the amplifiers and thus making the amplifier circuit amenable to the use of low cost components and providing inexpensive and economical conference call circuits. This is accomplished by utilizing degenerative feedback supplied by coupling a relatively low value resistance in the emitter circuits of each of the transistors. The feedback resistors are R14, R15, R16 and R17 in conference channel No. 1; R24, R25, R26 and R27 in conference channel No. 2; and R(*n*)4, R(*n*)5, R(*n*)6 and R(*n*)7 in conference channel No. *n*.

Means are provided whereby the conference call circuit is completed responsive to the attendant's operation of a set-up switch SW(*c*). In greater detail, when switch SW(*c*) is operated to the "conference" position, relay 295 is operated over an obvious circuit.

Responsive to the operation of relay 295, contacts 296*a* open to disconnect the ringback tone source from conference channel No. 1. Contacts 296*b* close to complete the receive circuit from transformer T12 to the tip and ring loop of a subscriber line. In a similar manner, contacts 297*a*, 297*b*, 299*a* and 299*b* operate to disconnect ringback tone and complete the receive circuits in their particular conference channels.

Also responsive to the operation of relay 295, contacts 298 close to complete the circuit that supplies power to the transistor amplifiers. In greater detail, a voltage divider circuit is completed when contacts 298 close. The circuit can be traced from battery through resistor RC1, contacts 298, resistors RC2, and RC3 to ground. A tap "—C" between contacts 298 and resistor RC2 provides collector voltage and is connected to the midpoints of one winding on each of the transformers T12, T22, T*n*2 in the receive circuits of the conference channels. A tap labeled "—B" between resistors RC2, RC3 is connected to similar points on transformers T11, T21, T*n*1 in the transmit circuits of the conference channels. Filter capacitors CC1, CC2 shunt the "—C" and "—B" voltage taps to provide a low impedance A.C. path to ground to keep voice currents out of the D.C. supply.

With the foregoing description of the component parts of the circuit in mind, it is thought that the invention may be best understood by the following description of the manner in which the circuit operates.

*Setting up the conference* (*automatic access*).—A subscriber requiring a conference call dials the connect code and is connected by the switch train to the attendant's board. Responsive to this connection a lamp (not shown) on the attendant's board lights up to notify the attendant, who then obtains information as to the directory numbers of the parties to be called. If the call is to be set up immediately, the attendant cross patches the calling subscriber to conference channel No. 1 through jacks 19*a* and 19*b* by means of suitable cords. A ground forwarded over the sleeve lead of jack 19*a* operates a relay (not shown) in the automatic switch train. Responsive to the operation of that relay, relay 210 operates from battery and ground potentials returned over the ring and tip leads RR1 and TR1. A loop condition is also extended over leads TR1 and RR1 to operate relay 220 as long as the subscriber remains off-hook.

Responsive to the operation of relay 210, contacts 211 close preparing a circuit for operation of lamp LP1 and relay 290 over a circuit that has previously been traced. These components do not operate, however, as long as there is an off-hook condition which operates relay 220.

Responsive to the operation of relay 220, contacts 221, 222 open to remove resistors R11, R12 from the circuits and contacts 223 open and thereby prevent the immediate operation of lamp LP1.

The attendant then proceeds to connect the remainder of the parties. Ringback tone is returned to the subscriber via capacitor C11, contacts 204 and 296*a* to inform him that the conference is being set up.

Assuming that conference channel No. 2 is used to connect with a called subscriber, then that channel is cross connected to a suitable outgoing automatic line by means of patching cords inserted in jacks 19*c* and 19*d*. Switch SW(2) is operated causing relay 230 to operate because SW(1) of the chain is unoperated. Responsive to the operation of relay 230, the attendant's headset and dial circuit are connected to the automatic outgoing line via jacks 19*c* and 19*d* and contacts 231, 232(*a*), 233, and 235. The attendant then dials the required number. The dial pulses are extended over tip and ring leads TR(*c*), RR(*c*), TR2, RR2, jack 19*d* to an automatic switch train such as switch trains 11, 14 (FIG. 1*a*). The called station is rung in a conventional manner.

When the called party answers, a loop is completed over tip and ring leads TR2 and RR2 through the automatic switch train to operate relay 250, over a circuit that extends from ground on the upper coil of relay 250 through ring lead RR2, jack 19*d*, the automatic switch train and battery is supplied through the lower coil of relay 250 and conductor TR2. Responsive to the operation of relay 250, the characteristic impedance resistor R21 is removed from the transmit portion of the circuit No. 2 by the opening of contacts 251. The characteristic impedance R22 in the receive circuit is removed when contacts 252 open. The circuit for supervisory lamp LP2 is opened by the operation of contacts 253. When this lamp is extinguished the attendant knows that the called subscriber station is connected. He then requests the subscriber to wait until the other conference parties are called, and restores the talk key SW(2) to its normal position. This releases relay 230 which causes relay 240 to operate and the attendant's dial and headset to be disconnected both over circuits previously traced.

The attendant then proceeds to call the other conference parties in an identical manner, until all have answered. When all the parties have been called, the attendant operates the means for completing the conference call circuit shown here as the conference setup switch SW(*c*) which operates relay 295 over an obvious circuit.

Responsive to the operation of relay 295, the ringback tone source RBT is disconnected at contacts 296*a*, 291*a*, and 299*a*. Each receive channel is connected to the associated transformer at contacts 296*b*, 297*b*, and 299*b*. The conference call circuit is now completed and ready for use.

At any time during the call the attendant can intercept and converse with any channel by operating the appropriate switch. For example, the attendant can intercept and converse with channel No. 1 by operating switch SW(1), thereby extending ground through the coil of relay 200. Relay 200 removes ringback tone source RBT and disconnects the tip lead TS and ring lead RS from relay 210. The attendant's headset is connected directly to the subscriber over a circuit that can be traced from the attendant headset 21 through jacks 19R, 19S over tip and ring leads TS(*c*), RS(*c*), TR(*c*) and RR(*c*), contacts 201*a*, 202*a*, 203 and 204, respectively, tip and ring leads TS1, RS1, TR1 and RR1 respectively, jacks on the attendant's board 19*a* and 19*b*, and the automatic switch train to the calling subscriber station. The leads TS(*c*), RS(*c*), TR(*c*) and RR(*c*) are the common sending and receiving leads that appear on the attendant's cabinet in this exemplary four-wire conference call circuit.

*Operation of the conference call circuit.*—When the first subscriber is talking, his speech currents are transmitted his line circuit, the automatic switch train and tip and ring leads TS1 and RS1 to isolating and amplifying means (here shown as transistor amplifiers Q11, Q12, Q13 and Q14). The input or base electrode of each amplifier connects to a bus that is connected across one side of transformer T11 and in series with a characteristic impedance terminating means such as R23. The output or collector electrode of each amplifier is connected to an individually associated bus in group 15. Therefore, variations caused by voice modulation of the base current of transistors Q11, Q12, Q13 and Q14 cause a larger variation in the collector current of these transistors and in the current on the buses 15. However, the voltage drop across the emitter resistors R14, R15, R16 and R17 tends to increase as the emitter-collector current through the transistors increases, thereby causing the emitters to become more negative and, consequently, lowering the potential difference between the emitter and the base which in turn tends to decrease the current. Therefore, the amplification is lessened but the stability of the amplifiers is increased. In other words, the resistors generate negative feedback in that they tend to reduce an increasing current or to increase a decreasing current.

The collector C of transistor Q11 is connected to terminal 3 of transformer T22, the recive transformer of conference channel No. 2. Thus, the voice circuit can be traced from ground through resistor R14, the emitter E and collector C of transistor Q11, bus 15*a*, terminal 3, the upper right-hand winding and terminal 4 of transformer T22 to the "—C" terminal of the common power supply, contacts 298 and resistor RC1 to battery. The current in the upper right-hand winding of transformer T22 induces a current in the left-hand winding of T22, which current flows through a circuit comprising contacts 297*b*, tip and ring leads TR2 and RR2, jack 19*d*, a patch cord similar to cord 20 (FIG. 1*a*), and through an automatic switch train 11 to subscriber B. Capacitors C24 and C25 are blocking capacitors to keep direct current out of the transformers and to prevent the transformer winding from short circuiting the relay 250.

In a similar manner, the collectors of all the transistors in each of the transmit channels is connected to a terminal 3 on the secondary winding of a receive transformer in another conference channel.

Thus, isolating and amplifying means, such as the individual transistors Q11–Q14, are used to connect each of the transmit portions of the conference channels to the receive portions of every other conference channel but not to the receive portion of the conference channel in which the transistors are located. Consequently, there is no feedback path in the conference channels between the transmitter and the receive portions of the same conference channels. Generally, therefore, there are $n$ number conference channels, and $n-1$ transistors, all of which serve to eliminate singing by isolating the receiver from its associated transmitter and to compensate for attenuation by amplifying the signals emitted from the transmit portions of the conference channel.

*Clearing the conference.*—When the first conference party clears, relay 220 releases but relay 210 remains operated from the ground and battery that are respectively on the top and ring leads TS1 and RS1 of the transmit portion of the conference channel. The release of the relay 220 reconnects the terminating impedances R11, R12 across the channel transformers T11, T12 permitting the remainder of the conference to proceed if required. The release of the relay 220 also causes the supervisory lamp LP1 to be connected in series (but not lit) with the alarm relay 290 via contacts 221, 223, which relay is thereby operated. Responsive to the operation of relay 290, contacts 291 close to complete a circuit which lights lamp LP1 via the low resistance coil of relay 290 to battery. This informs the attendant to release this connection by removing the patch cords.

In a similar manner each of the other participants in the conference call replaces his handset and the supervisory light in the attendant's cabinet associated with the conference channel to which they were connected lights up over the circuit analogous to that previously traced. When the supervisory lamps are lit, the attendant removes the patching cords and resets the setup switch SW(*c*). The conference circuit is disconnected and the switch train released.

Figure 3A:
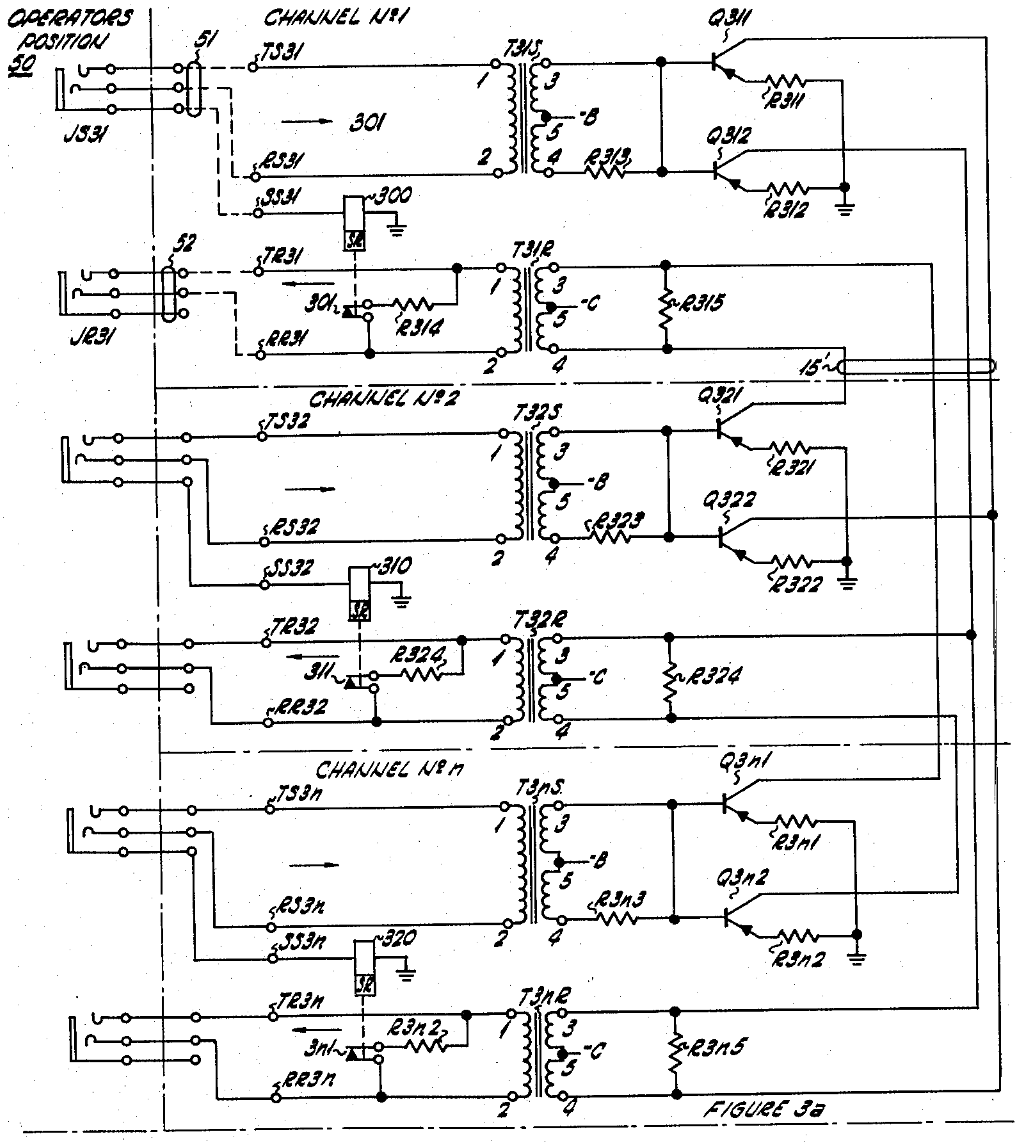
Figure 3B:
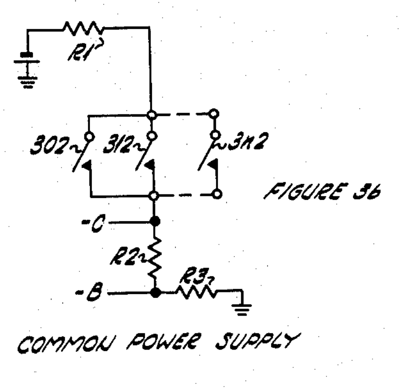

*Setting up the conference (manual access).*—Reference will now be made to FIG. 3*a* which shows the circuit details utilized when conference calls are set up manually. When an operator receives a request for a conference call setup, the required parties are called from an "operator position" 50 and then the conference circuit is set up by connecting the appropriate lines to the conference circuit via means such as patching cords, for example.

Each conference call channel includes a transmit side and a receive side as shown at 51, 52. The transmit side 51 includes as principal components a coupling transformer such as T31S, a number ($n-1$) of transistor amplifiers, and relay 300. The receive side 52 also includes a coupling transformer such as T31R which is connected to the output electrode of a transitor amplifier in each of the other conference call channels. Thus, the receive transformer T31R connects to the collector of the transistor amplifier Q321 and of the transistor amplifier Q3*n*1. The resistors R313, R315 provide impedance matching, resistors R311, R312 provide negative feedback and resistor R314 provides a termination when the channel is idle to soak up the signal power normally delivered to a subscriber connected to the channel.

Each conference channel appears on a separate two-way jack such as JS31, JR31 of a toll board and the operator by inserting the appropriate cord circuit plug into the two-way jack can connect a party into the conference through a conference channel.

When a subscriber line is plugged into a conference channel through jacks such as JS31 and JR31, relay 330 is operated from battery in the subscriber's line circuit that is applied to the sleeve of the jack. Responsive to the operation of relay 300, contacts 301 open to remove the terminating impedance resistor R314 from the circuit. Also responsive to the operation of relay 300, contacts 302 (FIG. 3*b*) are operated to a closed position causing battery to be applied to common power supply terminals —B and —C. Similar relays in channels No. 2 and No. $n$ control contacts 312 and 3*n*2. Terminal —C is connected between the contacts of the relays and resistor R2 while terminal —B is connected between resistors R2 and R3 which form a voltage divider.

Battery is applied to the base electrodes of the transistors in channels No. 1–$n$ over a circuit that can be traced from terminal —B through the right-hand windings of transformers T31S, T32S and T3*n*S to a common bus to which the bases of the transistors are attached. The collectors are supplied from terminal —C through the right-hand windings of the transformers T31R, T32R and T3*n*R. The emitter of each transistor is connected to ground through a negative feedback resistor, such as R311, which has a stabilizing effect as described previously in this specification.

*Operation of the manually connected conference circuit.*—Speech currents flowing through the send conductor such as TS31, RS31, TS32, RS32, TS3*n* and RS3*n* are amplified by the single stage transistor amplifiers, such as Q311, Q312 in channel No. 1; Q321, Q322 in channel No. 2, and Q3*n*1 and Q3*n*2 in channel No. $n$. Through these transistor amplifiers the signals are transmitted to the other channels in the conference circuit. Means for stabilizing the amplifiers are provided, such as resistors R311, R312 in channel No. 2; and R3*n*1 and R3*n*2 in channel No. $n$. These resistors in the emitter circuit of these transistor amplifiers provide negative feedback, thereby reducing the amplification but producing a much more stable output, that is not adversely affected by such things as temperature variations. The transmit sections of the conference channels are connected to the receive sections of all the other conference channels via common conductors 15′. There is no connection in the conference channel between the transmit and receive portions of the channel. Any sidetones the talking subscriber receives are provided by circuitry in his individual telephone set. This circuitry could be any of the circuits commonly in use for such purposes.

*Clearing the manually connected conference call circuit.*—When the parties in the conference call return their handsets to the associated hookswitches, on-hook supervision is received and cord circuit supervisory lamps light (not shown but similar to the supervisory lamps LP depicted in FIG. 2). The operator then takes down the patch cords that completed the conference connection. This causes the relays in the conference channels to release and the circuit is cleared.

While the principles of the invention have been shown and described in connection with specific apparatus, it is to be clearly understood that this description is made only by way of example and not as a limitation on the scope of the invention.

I claim:

1. In a telephone system for extending connections between calling and called ones of a plurality of subscriber stations, means for establishing a telephone conference call circuit comprising $n$ number subscriber stations, $n$ number conference call channels, each of said channels having transmit means and receive means, $n-1$ number of isolating means associated with each of said transmit means, said transmit means in each of said channels being connected to each of said receive means in other of said channels through individual ones of said isolating means, each of said isolating means comprising a negative feedback stabilized transistor amplifier, and means including attendant operated means for individually connecting each of said $n$ number subscriber stations to one of said conference channels to set up said conference call circuit.

2. In a telephone conference call circuit of claim 1 wherein the means for connecting each of said $n$ number subscriber stations to one of said conference call channels comprises automatic switching means.

3. In a telephone conference call circuit of claim 1 wherein the means for connecting each of said $n$ number subscriber stations to said conference channels comprises manual switching means.

4. A telephone conference call circuit comprising $n$ conference call channels, each of said channels having transmit means and receive means, and $n-1$ isolating means associated with each of said transmit means, said transmit means in each of said channels being connected to each of said receive means in other of said channels through one of said isolating means whereby the receive means is effectively isolated from the transmit means of the same channel and singing is prevented.

5. A telephone conference call circuit comprising $n$ subscriber stations, an operator's position, $n$ conference call channels, each of said channels having transmit means and receive means, means for connecting each of said channels to an operator's position, means for connecting each of said $n$ subscriber stations to said operator's position, means within said operator's position for connecting each of said $n$ subscriber stations to each of said $n$ conference channels, $n-1$ isolating means associated with each of said transmit means, said transmit means in each of said channels being connected to each of said receive means in other of said channels through one of said isolating means thereby conferencing all of said $n$ subscriber stations through each of said $n$ conference channels.

6. A telephone conference call circuit comprising $n$ channels, each of said channels having transmit means and receive means, $n-1$ isolating means associated with each of said transmit means, means for connecting said transmit means in each of said channels to each of said receive means in other of said channels through one of said isolating means whereby the receive means is effectively isolated from the transmit means of the same channel and singing is prevented.

7. In a telephone system for extending connections between calling and called ones of a plurality of subscriber stations, means for establishing a telephone conference call circuit comprising $n$ number of said subscriber stations, $n$ conference call channels for interconnecting said $n$ subscriber stations, each channel comprising receive means for receiving communication signals originating at said stations and transmit means for transmitting communication signals originating at said stations, a plurality of isolating means associated with each transmit means, means for connecting each of said transmit means of said channels to all of the other channels through said plurality of isolating means, means for connecting each of said $n$ subscriber stations to a different one of said $n$ channels to establish said conference call circuit, a plurality of terminating impedance means, and means for connecting said impedance means to ones of said channels responsive to ones of said $n$ subscriber stations disconnecting from said ones of said channels thereby maintaining a constant characteristic impedance for said conference call circuit.

8. In a telephone switching system for extending connections between calling ones and called ones of subscriber stations, said switching system comprising an attendant's cabinet, means comprising $n$ number conference call channels for establishing a conference call circuit between $n$ number of said subscriber stations, means for connecting said channels to said attendant's cabinet, common link means for interconnecting said channels, chain circuit means in said attendant's cabinet for individually connecting an associated one of said $n$ number subscriber stations to an idle one of said $n$ number channels thereby conferencing said $n$ number of subscriber stations, said chain circuit comprising $n$ number single pole double throw switches each having an armature and a pair of poles with said armature normally connected to a first one of said poles, means for individually connecting the first pole of each switch to the armature of a preceding one of said switches, means for connecting the armature of a first one of said switches to ground thereby grounding the armature on each normal one of said switches and means responsive to operating any of said switches to connect the grounded armature to the other pole for coupling the attendant's cabinet to the subscriber station associated with said operated switch via a portion of said individually connected conference call channel.

9. A telephone conference call circuit comprising $n$ number of channels, each of said channels having transmit means and receive means for transmitting and receiving conference communication signals, $n-1$ transistor amplifiers in each of said transmit means, means for interconnecting said channels including means for coupling an output electrode from each of said amplifiers to an individually associated one of said receive means in another channel, and means for stabilizing said transistor amplifiers comprising a series resistor coupled into the emitter circuit causing degenerative feedback which increases the stability of the transistor amplifier and thereby allows the utilization of low priced components.

References Cited in the file of this patent

UNITED STATES PATENTS

| | | |
|---|---|---|
| 2,843,682 | Schretzmayer | July 15, 1958 |
| 2,916,565 | Ensink et al. | Dec. 8, 1959 |
| 3,060,265 | Duncan et al. | Oct. 23, 1962 |